Patented Mar. 28, 1950

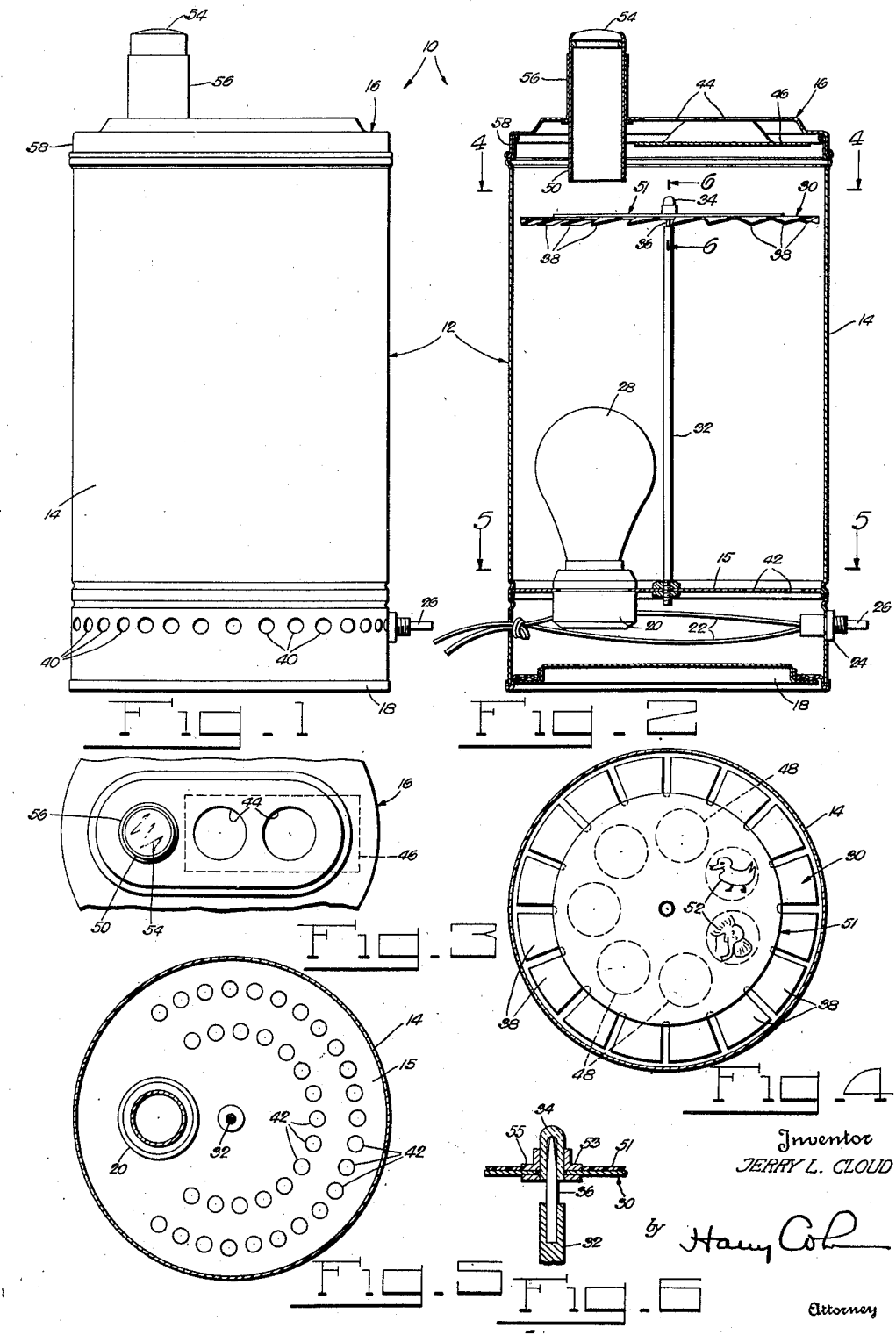

2,501,862

UNITED STATES PATENT OFFICE 2,501,862

MOVING PICTURE PROJECTOR WITH CONVECTION-CURRENT MOTOR AND PICTURE DISK

Jerry L. Cloud, New York, N. Y., assignor to G & G Precision Works, Inc., Long Island City, N. Y., a corporation of New York Application March 14, 1947, Serial No. 734,717

4 Claims. (Cl. 88—27)

The present invention relates to a moving picture projector which is particularly well adapted to be used by or for children.

One object of the invention is provision of a projector in which a single electrical or other energy-translating device is operable both to project the pictures optically and to effect mechanical movement of a transparency carrying the pictures to be projected so that as the images are projected they are caused to move on the viewing screen.

Another object of the invention is to provide a projector for projecting pictures upwardly onto a ceiling of a room, or onto any other horizontal screen, for view by an infant or by a young child lying on its back in a child's crib or bed, for the purpose of causing or inducing the child or infant to fall asleep more quickly than might otherwise be the case and to provide a pleasant condition which not only tends to accelerate the transition from wakefulness to sleep but also tends to promote a sound sleep free from the effects of disturbing influences.

A further object is to provide a projector which is of simple construction, of low cost and which is of small size and easy and inexpensive to operate for the above purposes or for other purposes.

The above and other objects, features and advantages of my invention will be fully understood from the following description considered in connection with the accompanying drawings which are to be taken as illustrative of the invention but not in limitation thereof.

In the drawings:

Fig. 1 is a side view of a projector embodying the present invention;

Fig. 2 is a vertical sectional view of the projector;

Fig. 3 is a top plan view of a part of the top of the projector;

Fig. 4 is a sectional view on the line 4—4 of Fig. 2;

Fig. 5 is a sectional view on the line 5—5 of Fig. 2;

Fig. 6 is a detail sectional view on the line 6—6 of Fig. 2.

Referring now to the drawings in detail, the projector 10 embodying my invention comprises a housing 12 which is preferably formed of sheet metal but which can be formed of any other suitable material. As here shown, said housing is cylindrical and includes the cylindrical wall 14, a bottom wall 15 secured to wall 14 internally thereof above its lower end, an upper flanged cover member 16 which fits removably on wall 14, and also preferably a lower end cover 18 which is preferably not removable. Bottom wall 15 and end cover 18 are spaced from each other to provide a space for the lamp socket 20 and for the electric wiring 22 and switch 24 which is mounted in wall 14 below bottom wall 15. Said switch is provided with an operating member 26 accessible for operation externally of the housing and the electric cord of wiring 22 extends through wall 14 and is provided with a conventional connector plug (not shown) for connection with a conventional outlet socket in the child's bed room.

An electric lamp 28 mounted in socket 20 constitutes the light source of the projector and also furnishes the energy for operating the rotary disk 30 which carries the pictures to be projected. The diameter of disk 30 is somewhat smaller than the internal diameter of cylindrical wall 14 of the housing, so as to provide proper clearance between said wall and the disk. Said disk 30 is mounted for rotation, in its own horizontal plane above lamp 28, by means of a supporting rod 32 secured at its lower end to bottom wall 15 and projecting upwardly thereof centrally of the housing 12. Disk 30 has a glass or other suitable anti-friction cup-bearing 34 which rests on the pointed end of a pin 36 at the upper end of supporting rod 32. Disk 30 is preferably formed of sheet metal and is provided at its outer marginal edge with a series of integral vanes 38 which are operable to rotate said disk by the current of air which flows upwardly in the housing when lamp 28 is energized, in accordance with well understood principles. The air inlet to the housing is constituted by a series of circumferentially spaced openings 40 provided in the lower part of peripheral wall 14 below bottom wall 15, the latter being provided with a plurality of openings 42 for the passage of air upwardly in the housing around lamp 28. The outlet for the heated air is provided in the cover 16 and, as here shown, comprises the openings 44 in the top of said cover. A light baffle 46 is provided on said cover at the inner side thereof to prevent the passage of light through the air-outlet openings 44 without interfering with the flow of air.

The motor disk 30 is provided with a plurality of circumferentially spaced light openings 48 disposed radially inwardly of the vanes 38 in position to register successively with lamp 28 and the vertical light outlet tube 50. A picture carrying disk 51 is carried by motor disk 30 and has a plurality of picture transparencies 52 disposed in circumferentially spaced relation over the light outlet openings or passages 48, respectively, of the disk, there being a picture transparency 52 for each light passage 48 of the motor disk. It will be observed that access to the interior of the housing may be obtained, by removing cover 16, for changing the picture disk 51 or for replacing lamp 28. Indexing marks or other means may be placed on the rim 58 of cover 16 and on the upper part of wall 14 in order to facilitate the positioning of the light outlet 50 in registry with the longitudinal axis of lamp 28 when the cover 16 is placed in position on the housing.

During the rotation of disk 30, the picture transparencies 52 are moved in succession between lamp 28 and the inner end of light outlet tube 50 for projection upwardly through tube 50 onto the ceiling of the child's bed room. A magnifying lens 54 is provided for magnifying the picture images. Light-outlet or lens tube 50 is slidably mounted in the supporting tube 56 formed on cover 16 so that tube 50 is adjustable for focusing purposes. The picture-transparency disk 51 is releasably secured in position on motor disk 30 by the frictional engagement of the bearing-holding member 53 of disk 30 with disk 51 in the central opening 55 of the latter as shown in Fig. 6. Disk 51 may be made of a thin plastic sheet or of any other suitable lightweight material. If desired, the images may be projected onto a vertical wall or screen, instead of on the horizontal screen constituted by the ceiling, and this may be readily accomplished by mounting a light reflector in position over lens 54 with the reflecting surface at an angle of 45° to the axis of tube 50.

Thus it is seen that the projector which I have provided as described above is well adapted to accomplish the several objects of the invention. The projector may be of small size and is readily portable. For example, but without limitation, the housing is suitably about five inches in diameter and eight inches high, so that it takes up very little room and can be mounted on a small table near the child's crib or bed. An electric lamp (lamp 28) of the order of 25 watts generates sufficient light to project the images and also generates sufficient heat for causing the convection air-current flow to rotate the motor disk 30. It will be understood that the subject matter of the picture transparencies should be selected in accordance with the age of the child and that any of a plurality of picture disks 51 can be interchangeably mounted on disk 30. Further, it will be understood that each picture transparency may include or consist of words or letters which are, therefore, included within the term "picture" as used in the claims. The projector of the present invention may be considered an educational toy as well as a device operable to induce sleep.

Various changes in the details of construction and in the arrangement of parts may be made without departing from the underlying idea and principles of the invention within the scope of the appended claims.

Having thus described my invention, what I claim and desire to secure by Letters Patent, is:

1. In a projector for projecting an image upon a viewing surface, a housing having a light projection outlet provided with a projection lens, a convection-current motor disk mounted for rotation in said housing, said disk having a marginal edge portion thereof provided with vanes and having a part radially inward of said vanes for supporting an image-transparency in horizontal position thereon whereby to move the latter in a circular path into and out of registry with said projection outlet during the rotation of said disk, said radially inward part of the disk having a light passage therethrough positioned to move in a circular path into and out of registry with said projection outlet during the rotation of said disk, said transparency completely overlying said light passage, and a light source disposed below said disk to provide heat for rotating the latter and to project light through said light passage and said transparency for projecting the image thereon through said projection outlet and said lens onto said viewing surface during registry of said transparency with said projection outlet.

2. In a projector for projecting an image upon a viewing surface, a housing having a light projection outlet provided with a projection lens, a convection-current motor disk mounted for rotation in said housing, said disk having a marginal edge portion thereof provided with vanes and having a part radially inward of said vanes for supporting an image-transparency in horizontal position thereon whereby to move the latter in a circular path into and out of registry with said projection outlet during the rotation of said disk, said radially inward part of the disk having a light passage therethrough positioned to move in a circular path into and out of registry with said projection outlet during the rotation of said disk, said transparency completely overlying said light passage, and a light source disposed below said disk to provide heat for rotating the latter and to project light through said light passage and said transparency for projecting the image thereon through said projection outlet and said lens onto said viewing surface during registry of said transparency with said projection outlet, said light source being in axial alignment with said projection outlet, and said image-transparency being disposed eccentrically of said light source between the latter and said projection outlet.

3. In a projector for projecting an image upon a viewing surface, a housing having a top cover provided with a horizontal light projection outlet, a convection-current motor disk mounted for rotation about a vertical axis which is offset laterally of said projection outlet, said disk having a marginal edge portion thereof provided with vanes and a part disposed radially inward of said vanes provided with a plurality of circumferentially spaced light passages which are positioned so as to register in succession with said projection outlet during the rotation of said disk, and a light source mounted in said housing below said disk for rotating the latter, said light source being in optical registry with said projection outlet, said radially inward part being disposed eccentrically of said light source between the latter and said projection outlet whereby the light passages thereof are positioned individually in succession during the rotation of said disk for the projection of light from said source through said passages and through said projection outlet, and picture-transparency means mounted on said radially inward part of the disk in registry with and completely overlying said light passages thereof for projection onto said viewing surface by said light source.

4. In a projector for projecting an image upon a viewing surface, a housing having a top cover provided with a horizontal light projection outlet, a convection-current motor disk mounted for rotation about a vertical axis which is offset laterally of said projection outlet, said disk having a marginal edge portion thereof provided with vanes and a part disposed radially inward of said vanes provided with a plurality of circumferentially spaced light passages which are positioned so as to register in succession with said projection outlet during the rotation of said disk, and a light source mounted in said housing below said disk for rotating the latter, said light source being in optical registry with said projection outlet, said radially inward part being disposed eccentrically of said light source between the latter and said projection outlet whereby the light passages thereof are positioned individually in succession during the rotation of said disk for the projection of light from said source through said passages and through said projection outlet, and picture-transparency means mounted on said radially inward part of the disk in registry with and completely overlying said light passages thereof for projection onto said viewing surface by said light source, said picture-transparency means comprising a plurality of separate image-transparencies, each of said light passages being completely covered by one of said image-transparencies.

JERRY L. CLOUD.

REFERENCES CITED

The following references are of record in the file of this patent:

UNITED STATES PATENTS

| Number | Name | Date |
|---|---|---|
| 1,058,445 | Lessing | Apr. 8, 1913 |
| 1,341,201 | Sperling | May 25, 1920 |
| 1,567,471 | Skeen | Dec. 29, 1925 |
| 1,781,596 | Page | Nov. 11, 1930 |

FOREIGN PATENTS

| Number | Country | Date |
|---|---|---|
| 668,360 | France | July 9, 1929 |